United States Patent
Ryu et al.

(10) Patent No.: US 10,026,980 B2
(45) Date of Patent: Jul. 17, 2018

(54) METHOD AND SYSTEM FOR MAINTAINING STABILITY OF SYSTEM OF FUEL CELL VEHICLE

(71) Applicant: Hyundai Motor Company, Seoul (KR)

(72) Inventors: Seong Pil Ryu, Gyeonggi-do (KR); Sung Suk Ok, Gyeonggi-do (KR); Ji Tae Kim, Gyeonggi-do (KR); Kyu Il Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/958,507

(22) Filed: Dec. 3, 2015

(65) Prior Publication Data
US 2016/0335815 A1    Nov. 17, 2016

(30) Foreign Application Priority Data
May 14, 2015    (KR) ........................ 10-2015-0067562

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2018.01) |
| *G07C 5/00* | (2006.01) |
| *H01M 8/04664* | (2016.01) |
| *B60L 1/00* | (2006.01) |
| *B60L 3/00* | (2006.01) |

(Continued)

(52) U.S. Cl.
CPC ........... *H01M 8/04686* (2013.01); *B60L 1/00* (2013.01); *B60L 3/003* (2013.01); *B60L 3/0038* (2013.01); *B60L 3/0053* (2013.01); *B60L 11/1883* (2013.01); *H01M 8/04425* (2013.01); *H01M 2250/20* (2013.01); *Y02T 90/32* (2013.01); *Y02T 90/34* (2013.01)

(58) Field of Classification Search
CPC ......... H01M 8/04686; H01M 8/04425; H01M 2250/20; B60L 1/00; B60L 3/003; B60L 3/0038; B60L 3/0053; B60L 11/1883; Y02T 90/32; Y02T 90/34
USPC ........................................................ 701/29.7
See application file for complete search history.

(56) References Cited

U.S. PATENT DOCUMENTS

| | | | |
|---|---|---|---|
| 6,815,108 B2 | 11/2004 | Ueda et al. | |
| 2004/0229088 A1* | 11/2004 | Hayashi | ............ H01M 8/04231 429/429 |

(Continued)

FOREIGN PATENT DOCUMENTS

| | | |
|---|---|---|
| JP | 2009-158155 A | 7/2009 |
| KR | 10-2009-0062339 A | 6/2009 |

(Continued)

*Primary Examiner* — Aaron L Troost
*Assistant Examiner* — Paula Lynn Schneider
(74) *Attorney, Agent, or Firm* — Mintz Levin Cohn Ferris Glovsky and Popeo, P.C.; Peter F. Corless

(57) ABSTRACT

A method and system for maintaining stability of a system of a fuel cell vehicle are provided to prevent malfunction of sensors of a low voltage DC-DC converter and the respective controllers. A start timing of a fault diagnosis for the low voltage DC-DC converter and the respective controllers is determined and a deviation between voltages of the sensors of the low voltage DC-DC converter and the respective controllers is detected to determine whether the low voltage DC-DC converter and the respective controllers fail.

19 Claims, 2 Drawing Sheets

(51) Int. Cl.
*B60L 11/18* (2006.01)
*H01M 8/0438* (2016.01)

(56) References Cited

U.S. PATENT DOCUMENTS

| | | | |
|---|---|---|---|
| 2006/0224360 A1* | 10/2006 | Kishimoto | B60L 3/0023 702/183 |
| 2008/0311449 A1 | 12/2008 | Kaito | |
| 2009/0158079 A1 | 6/2009 | Chung et al. | |
| 2014/0026633 A1 | 1/2014 | Cai et al. | |
| 2014/0324283 A1 | 10/2014 | Kim et al. | |

FOREIGN PATENT DOCUMENTS

| KR | 10-2009-0062428 A | 6/2009 |
|---|---|---|
| KR | 10-0966226 B1 | 6/2010 |
| KR | 10-2013-0053037 A | 5/2013 |
| KR | 10-2014-0123838 A | 10/2014 |
| KR | 10-2014-0129554 A | 11/2014 |

\* cited by examiner

METHOD AND SYSTEM FOR MAINTAINING STABILITY OF SYSTEM OF FUEL CELL VEHICLE

CROSS-REFERENCE TO RELATED APPLICATION

This application is based on and claims the benefit of priority to Korean Patent Application No. 10-2015-0067562, filed on May 14, 2015 in the Korean Intellectual Property Office, the disclosure of which is incorporated herein in its entirety by reference.

TECHNICAL FIELD

The present disclosure relates to a method and system for maintaining stability of a system of a fuel cell vehicle, and more particularly, to a method for maintaining stability of a system of a fuel cell vehicle that determines effectiveness of voltages of sensors of a low voltage DC-DC converter and controllers.

BACKGROUND

As is well-known, in a fuel cell vehicle in which a fuel cell system is mounted, hydrogen used as fuel is supplied to a fuel cell stack to generate electricity, and an electric motor is operated by electricity generated by the fuel cell stack to drive the vehicle. In particular, the fuel cell system is a type of generation system which does not convert chemical energy of the fuel into heat by combustion, but electrochemically and directly converts the chemical energy into electric energy in the fuel cell stack.

In the fuel cell system described above, high pure hydrogen is supplied to an anode of a fuel cell from a hydrogen storing tank during the operation of the fuel cell system, and air in the atmosphere is directly supplied to a cathode of the fuel cell using an air supply apparatus such as an air blower. Accordingly, the hydrogen supplied to the fuel cell stack is separated into hydrogen ions and electrons by a catalyst of the anode, the separated hydrogen ions are moved into the cathode through a poly electrolyte membrane, and oxygen supplied to the cathode is coupled to electrons supplied to the cathode through an external lead wire to generate electric energy while generating water.

The fuel cell system described above involves a control function that includes a supply of air, a supply of hydrogen, a heat management, and the like, a control function for a power distribution between a high voltage battery and the fuel cell system, and a control function for driving a vehicle based on an intention of a driver, and operating controllers based on a sensor to perform the above-mentioned control functions. However, the controllers based on the sensor have a problem with reliability or the sensor may not sense continuously.

SUMMARY

The present disclosure provides a method and system for maintaining stability of a system of a fuel cell vehicle capable of preventing malfunction of sensors of a low voltage direct current-direct current (DC-DC) converter and the respective controllers and increasing reliability of the fuel cell vehicle by determining a start timing of a fault diagnosis for the low voltage DC-DC converter and the respective controllers and detecting deviation between voltages of the sensors of the low voltage DC-DC converter and the respective controllers matched the determined start timing of the fault diagnosis to determine whether the low voltage DC-DC converter and the respective controllers fail (e.g., whether a failure or error occurs), by a central processing unit (CPU) disposed within the system of the fuel cell vehicle.

Other objects and advantages of the present disclosure may be appreciated by the following description and will be clearly described by the exemplary embodiments of the present disclosure. It will be easily known that the objects and advantages of the present disclosure may be implemented by means and a combination thereof shown in the appended claims.

According to an exemplary embodiment of the present disclosure, a method for maintaining stability of a system of a fuel cell vehicle may include determining, by a central processing unit (e.g., a processor) disposed within the system, whether an ignition condition of the vehicle and driving conditions of the respective controllers are satisfied; determining, by the processor, whether a driving condition of a low voltage DC-DC converter is satisfied; and determining whether the low voltage DC-DC converter and the controllers fail (e.g., whether a failure or error occurs).

In the determination of whether the ignition condition of the vehicle is satisfied, the processor may be configured to start a fault diagnosis of the low voltage DC-DC converter and the respective controllers, in an interval from a turn-on of a key of the vehicle to a completion of an ignition of the vehicle before an interval in which the low voltage DC-DC converter supplies power and an interval from a turn-off of the key of the vehicle to a termination of the ignition of the vehicle after the interval in which the low voltage DC-DC converter supplies power. In addition, in the determination of whether the driving condition of the vehicle is satisfied, the processor may be configured to start a fault diagnosis when a revolutions per minute (RPM) value of an air blower is less than a threshold, an amount of current in the system of the fuel cell vehicle is less than a threshold, or consumed power is less than a threshold, after the ignition of the vehicle.

In the determination of whether the driving condition of the low voltage DC-DC converter is satisfied, the processor may be configured to start a fault diagnosis when an amount of current of the low voltage DC-DC converter is less than a threshold or consumed power of the low voltage DC-DC converter is less than a threshold. The determination of whether the low voltage DC-DC converter and the controllers fail may include comparing driving cycles for fault information of the vehicle with a preset cycle in response to determining that the low voltage DC-DC converter and the controllers fail.

In the comparison of the driving cycles for the fault information of the vehicle with the preset cycle, when the driving cycles for the fault information are greater than the preset cycle, a fault occurrence may be determined. In addition, in the comparison of the driving cycles for the fault information of the vehicle with the preset cycle, when the driving cycles for the fault information are less than the preset cycle, the fault information and the driving cycles may be stored.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
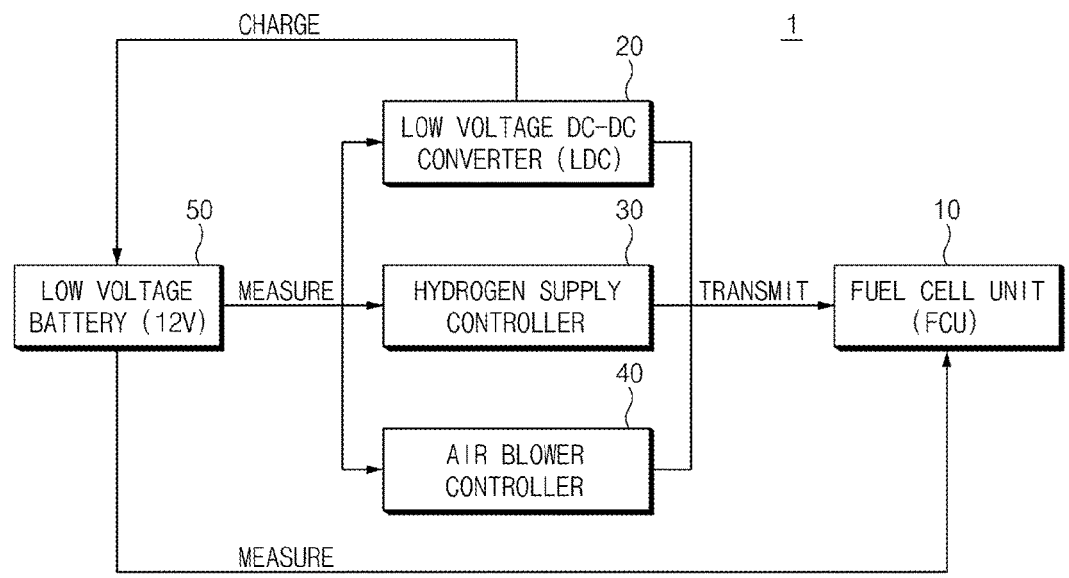
FIG. 1 is a diagram illustrating a structure measuring a voltage for each controller within a system of a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, when it is determined that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

FIG. 1 is a diagram illustrating a structure measuring a voltage for each controller within a system of a fuel cell vehicle according to an exemplary embodiment of the present disclosure. The system of the fuel cell vehicle may include a central processing unit (CPU) 1 (e.g., a processor), configured to execute and input/output functions of a vehicle, in addition to executing control functions of the respective controllers and a low voltage DC-DC converter.

Referring to FIG. 1, a plurality of sensors including the respective controllers including a fuel cell unit (FCU) 10, a low voltage DC-DC converter (LDC) 20, a hydrogen supply controller 30 or a fuel process system (FPS), an air blower controller 40 or BPCU, or the like, may be configured to measure a voltage of a low voltage battery (e.g., auxiliary battery) 50, and the processor 1 may be configured to calculate a deviation average value of the voltages measured by the controllers and then determine whether the deviation average value of the voltages exceed a threshold. Further, the low voltage DC-DC converter 20 may be configured to charge the low voltage battery 50 after an ignition of the vehicle, and supply power to electronic loads of the vehicle.

Figure 2:
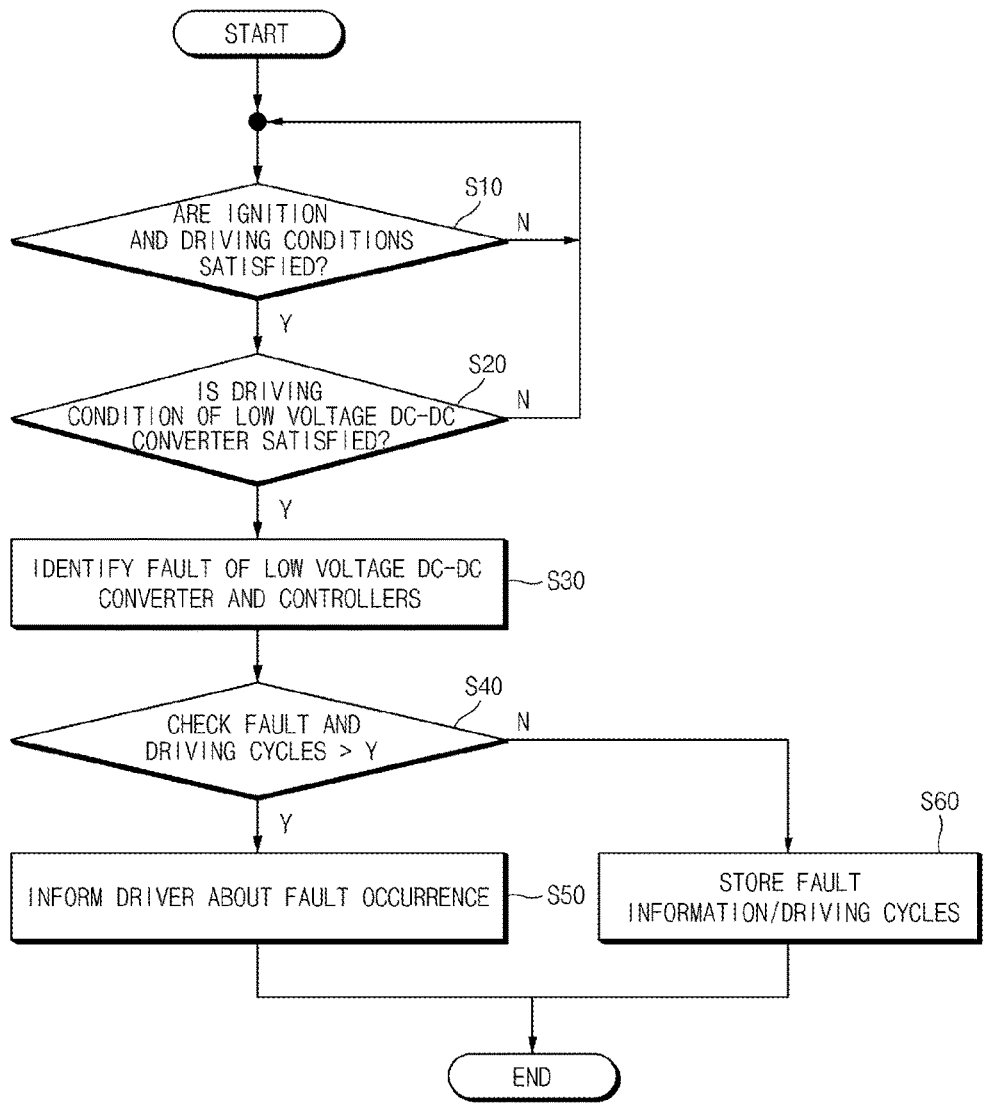
FIG. 2 is a diagram illustrating a method for determining whether a low voltage DC-DC converter and controllers fail in a system of a fuel cell vehicle according to an exemplary embodiment of the present disclosure.

FIG. 2 is a diagram illustrating a method for determining whether a low voltage DC-DC converter and controllers fail in a system of a fuel cell vehicle according to an exemplary embodiment of the present disclosure. Retelling to FIG. 2, the CPU within the system of the fuel cell vehicle may be configured to detect whether an ignition condition and a driving condition of the vehicle are satisfied (S10).

Hereinafter, a method for detecting whether the ignition condition of the vehicle is satisfied will be described in detail. The processor may be configured to start a fault diagnosis of the low voltage DC-DC converter and the respective controllers in an interval from a vehicle key turn-on to a completion of a vehicle ignition before an interval in which the low voltage DC-DC converter supplies power, and an interval from a vehicle key turn-off to a termination of the vehicle ignition after the interval in which the low voltage DC-DC converter supplies power.

Hereinafter, a method for detecting whether the driving condition of the vehicle is satisfied will be described in detail. The processor may be configured to start the fault diagnosis when a revolutions per minute (RPM) value of an air blower is less than a threshold, an amount of current in the system of the fuel cell vehicle is less than a threshold, or consumed power is less than a threshold, after the ignition of the vehicle.

Further, the processor may be configured to detect whether a driving condition of the low voltage DC-DC converter is satisfied (S20). In particular, the processor may be configured to start the fault diagnosis when variation of loads such as an electronic cooling pump, a motor driven power steering (MOPS), and the like that use power of the low voltage DC-DC converter, that is, an amount of current of the low voltage DC-DC converter is less than a threshold, or consumed power of the low voltage DC-DC converter is less than a threshold. The processor may then be configured to determine whether the low voltage DC-DC converter (LDC) and the respective controllers fail (e.g., whether a failure or error occurs in the LDC or controllers) (S30).

A method for diagnosing the fault of the low voltage DC-DC converter and the respective controllers will be described in detail. The sensors included in the low voltage DC-DC converter and the respective controllers may be configured to measure a voltage, and the processor may be configured to calculate a deviation average value of the voltages. The processor may then be configured to detect flags for whether the calculated deviation average value of the voltages of the low voltage DC-DC converter and the respective controllers exceeds a threshold.

When the deviation average value of a voltage of the fuel cell unit, a voltage of the low voltage DC-DC converter, a voltage of the air blower controller, or a voltage of the hydrogen supply controller is greater than the threshold, the processor may be configured to determine that the low voltage DC-DC converter and the respective controllers fail. Specifically, as shown in the following Table 1, the processor may be configured to detect the flags based on whether the deviation average value of the voltage of the fuel cell unit, the voltage of the low voltage DC-DC converter, the voltage of the air blower controller, or the voltage of the hydrogen supply controller exceeds the threshold, and when both flags are 0, the processor may be configured to determine that the low voltage DC-DC converter may be normally operated (e.g., operated without failure or error).

However, the processor detects the flags based on whether the deviation average value of the voltage of the fuel cell unit, the voltage of the low voltage DC-DC converter, the voltage of the air blower controller, or the voltage of the hydrogen supply controller exceeds the threshold, and when both flags are 1, the processor may be configured to determine a failure of the low voltage DC-DC converter. For example, the processor may be configured to detect the flag based on whether the deviation average value of the voltage of the fuel cell unit (FCU) exceeds the threshold, and when the corresponding flag is 1, the processor may be configured to determine a failure of a voltage sensor of the fuel cell unit (FCU).

TABLE 1

| | Sensor of Deviation Average Value > Threshold | | | |
|---|---|---|---|---|
| | V_FCU | V_LDC | V_BPCU or V_FPS | Identification |
| 1 | 0 | 0 | 0 | LDC Normal Operation |
| 2 | 1 | 0 | 0 | $V_{FCU}$ |
| 3 | 0 | 1 | 0 | $V_{LDC}$ |
| 4 | 0 | 0 | 1 | $V_{BPCU\ or\ FPS}$ |
| 5 | 1 | 1 | 0 | $V_{FCU}, V_{LDC}$ |
| 6 | 0 | 1 | 1 | $V_{DC/BPCU\ or\ FPS}$ |
| 7 | 1 | 0 | 1 | $V_{FCU/BPCU\ or\ FPS}$ |
| 8 | 1 | 1 | 1 | LDC Fault |

Furthermore, when the deviation average value is greater than the threshold, the processor may be configured to store determined fault information of the low voltage DC-DC converter and the controllers in a memory. When the processor determines that the low voltage DC-DC converter or the respective controllers fail, the processor may be configured to determine whether driving cycles for the fault information occur Y times or more (S40).

Particularly, when the driving cycles for the fault information occur Y times or more, the processor may be configured to inform (e.g., output a notification to) a driver regarding the fault information (S50). However, when the driving cycles for the fault information occur Y times or less, the memory included in the processor may be configured to not output the notification to the driver regarding the fault information and the driving cycles, but may be configured to store the fault information and the driving cycles (S60).

As described above, according to the exemplary embodiment of the present disclosure, whether the low voltage DC-DC converter and the respective controllers fail may be determined by determining the deviation between the voltages of the sensors of the low voltage DC-DC converter and the respective controllers, thereby making it possible to prevent malfunction of the low voltage DC-DC converter and the respective controllers and increase reliability of the system of the fuel cell vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for maintaining stability of a system of a fuel cell vehicle, comprising:
   determining, by a processor included within the system, that an ignition condition of the vehicle and driving conditions of respective controllers are satisfied;
   determining, by the processor, that a driving condition of a low voltage direct current-direct current (DC-DC) converter is satisfied;
   determining, by the processor, that the low voltage DC-DC converter and the controllers fail to increase reliability of the system by measuring a voltage by sensors in the low voltage DC-DC converter and the controllers, calculating a deviation average value of the voltages, and comparing the calculated deviation average value with a threshold value; and
   operating, by the processor, the fuel cell vehicle when determining that the low voltage DC-DC converter and controllers fail to increase reliability of the system of the fuel cell vehicle.

2. The method according to claim 1, wherein in the determination that the ignition condition of the vehicle is satisfied, the processor is configured to start a fault diagnosis of the low voltage DC-DC converter and the respective controllers, in an interval from a turn-on of a vehicle key to a completion of the vehicle ignition before an interval in which the low voltage DC-DC converter supplies power and an interval from a turn-off of the vehicle key to a termination of the vehicle ignition after the interval in which the low voltage DC-DC converter supplies power.

3. The method according to claim 1, wherein in the determination that the ignition condition of the vehicle and driving conditions of respective controllers are satisfied, the processor is configured to start a fault diagnosis when a revolutions per minute (RPM) value of an air blower is less than a threshold, an amount of current in the system of the fuel cell vehicle is less than a threshold, or consumed power is less than a threshold, after the ignition of the vehicle.

4. The method according to claim 1, wherein in the determination that the driving condition of the low voltage DC-DC converter is satisfied, the processor is configured to start a fault diagnosis when an amount of current of the low voltage DC-DC converter is less than a threshold or consumed power of the low voltage DC-DC converter is less than a threshold.

5. The method according to claim 1, wherein the determination that the at the low voltage DC-DC converter and the controllers fail includes:

comparing, by the controller, driving cycles for fault information of the vehicle with a preset cycle in response to determining that the low voltage DC-DC converter and the controllers fail.

6. The method according to claim 5, wherein in the comparison of the driving cycles for the fault information of the vehicle with the preset cycle, when the driving cycles for the fault information are greater than the preset cycle, a fault occurrence notification is output.

7. The method according to claim 5, wherein in the comparison of the driving cycles for the fault information of the vehicle with the preset cycle, when the driving cycles for the fault information are less than the preset cycle, the fault information and the driving cycles are stored.

8. A system for maintaining stability of a system of a fuel cell vehicle, comprising:
a memory configured to store program instructions; and
a processor configured to execute the program instructions, the program instructions when executed configured to:
determine that an ignition condition of the vehicle and driving conditions of respective controllers are satisfied;
determine that a driving condition of a low voltage direct current-direct current (DC-DC) converter is satisfied;
determine that the low voltage DC-DC converter and the controllers fail to increase reliability of the system by measuring a voltage by sensors in the low voltage DC-DC converter and the controllers, calculating a deviation average value of the voltages, and comparing the calculated deviation average value with a threshold value; and
operate the fuel cell vehicle when determining that the low voltage DC-DC converter and controllers fail to increase stability of the system of the fuel cell vehicle.

9. The system according to claim 8, wherein in the determination that the ignition condition of the vehicle is satisfied, the program instructions when executed are further configured to start a fault diagnosis of the low voltage DC-DC converter and the respective controllers, in an interval from a turn-on of a vehicle key to a completion of the vehicle ignition before an interval in which the low voltage DC-DC converter supplies power and an interval from a turn-off of the vehicle key to a termination of the vehicle ignition after the interval in which the low voltage DC-DC converter supplies power.

10. The system according to claim 8, wherein in the determination that the ignition condition of the vehicle and driving conditions of respective controllers are satisfied, the program instructions when executed are further configured to start a fault diagnosis when a revolutions per minute (RPM) value of an air blower is less than a threshold, an amount of current in the system of the fuel cell vehicle is less than a threshold, or consumed power is less than a threshold, after the ignition of the vehicle.

11. The system according to claim 8, wherein in the determination that the driving condition of the low voltage DC-DC converter is satisfied, the program instructions when executed are further configured to start a fault diagnosis when an amount of current of the low voltage DC-DC converter is less than a threshold or consumed power of the low voltage DC-DC converter is less than a threshold.

12. The system according to claim 8, wherein the program instructions for the determination that the low voltage DC-DC converter and the controllers fail when executed are further configured to:
compare driving cycles for fault information of the vehicle with a preset cycle in response to determining that the low voltage DC-DC converter and the controllers fail.

13. The system according to claim 12, wherein in the comparison of the driving cycles for the fault information of the vehicle with the preset cycle, when the driving cycles for the fault information are greater than the preset cycle, a fault occurrence notification is output.

14. The system according to claim 12, wherein in the comparison of the driving cycles for the fault information of the vehicle with the preset cycle, when the driving cycles for the fault information are less than the preset cycle, the fault information and the driving cycles are stored.

15. A non-transitory computer readable medium containing program instructions executed by a processor, the computer readable medium comprising:
determine that an ignition condition of a fuel cell vehicle and driving conditions of respective controllers are satisfied;
determine that a driving condition of a low voltage direct current-direct current (DC-DC) converter is satisfied;
determine that the low voltage DC-DC converter and the controllers fail to increase reliability of the system by measuring a voltage by sensors in the low voltage DC-DC converter and the controllers, calculating a deviation average value of the voltages, and comparing the calculated deviation average value with a threshold value; and
operate the fuel cell vehicle when determining that the low voltage DC-DC converter and controllers fail to increase reliability of the system of the fuel cell vehicle.

16. The non-transitory computer readable medium of claim 15, further comprising:
program instructions that start a fault diagnosis of the low voltage DC-DC converter and the respective controllers, in an interval from a turn-on of a vehicle key to a completion of the vehicle ignition before an interval in which the low voltage DC-DC converter supplies power and an interval from a turn-off of the vehicle key to a termination of the vehicle ignition after the interval in which the low voltage DC-DC converter supplies power.

17. The non-transitory computer readable medium of claim 15, further comprising:
program instructions that start a fault diagnosis when a revolutions per minute (RPM) value of an air blower is less than a threshold, an amount of current in the system of the fuel cell vehicle is less than a threshold, or consumed power is less than a threshold, after the ignition of the vehicle.

18. The non-transitory computer readable medium of claim 15, further comprising:
program instructions that start a fault diagnosis when an amount of current of the low voltage DC-DC converter is less than a threshold or consumed power of the low voltage DC-DC converter is less than a threshold.

19. The non-transitory computer readable medium of claim 15, further comprising: program instructions that compare driving cycles for fault information of the vehicle with a preset cycle in response to determining that the low voltage DC-DC converter and the controllers fail.

* * * * *